United States Patent
Hillen et al.

(10) Patent No.: US 8,952,291 B2
(45) Date of Patent: Feb. 10, 2015

(54) SYSTEM AND METHOD FOR CONTROLLING A HYBRID WELDING PROCESS

(75) Inventors: Edward Hillen, Painesville, OH (US); Joseph Daniel, Sagamore Hills, OH (US); Tom Matthews, Chesterland, OH (US); Steve Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1398 days.

(21) Appl. No.: 12/254,067

(22) Filed: Oct. 20, 2008

(65) Prior Publication Data

US 2010/0096373 A1    Apr. 22, 2010

(51) Int. Cl.
B23K 9/10      (2006.01)
B23K 26/14     (2014.01)

(52) U.S. Cl.
CPC .................................. *B23K 26/1429* (2013.01)
USPC ..................................................... 219/130.01

(58) Field of Classification Search
USPC ......... 219/121.63, 125.1, 130.01, 130.5, 132, 219/137 PS
See application file for complete search history.

(56) References Cited

U.S. PATENT DOCUMENTS

| | | | |
|---|---|---|---|
| 5,278,390 A | | 1/1994 | Blankenship |
| 6,034,343 A | | 3/2000 | Hashimoto et al. |
| 2003/0006222 A1 | * | 1/2003 | Houston et al. .......... 219/130.51 |
| 2005/0167403 A1 | * | 8/2005 | Petring ...................... 219/121.6 |
| 2006/0237409 A1 | * | 10/2006 | Uecker et al. .............. 219/130.5 |
| 2007/0056942 A1 | | 3/2007 | Daniel et al. |
| 2007/0164007 A1 | | 7/2007 | Peters et al. |
| 2008/0006612 A1 | | 1/2008 | Peters et al. |
| 2008/0128395 A1 | | 6/2008 | Aigner et al. |

FOREIGN PATENT DOCUMENTS

DE    196 00 627 C1    5/1997
WO    03/089185 A1    10/2003

OTHER PUBLICATIONS

PCT/IB2009/007172 International Search Report dated Mar. 12, 2010.
PCT/IB2009/007172 Written Opinion dated Mar. 12, 2010.
Digital Communications Improves Productivity, Quality and Safety, NX-1.20, Mar. 2006, www.lincolnelectric.com, pp. 1-12.
Power Wave 445M Robotic & Power Wave 445M/STT Robotic, Publication E10.90 Apr. 2003, www.lincolnelectric.com, pp. 1-8.

* cited by examiner

*Primary Examiner* — Brian Jennison
(74) *Attorney, Agent, or Firm* — Hahn Loeser & Parks LLP; Brendan E. Clark (57) ABSTRACT

A system and method for controlling a hybrid welding process. An integrated hybrid welding power source includes a first power supply for providing a first welding output and a second power supply for providing a second welding output. The first power supply and the second power supply are operatively connected to coordinate the first welding output with the second welding output in real time while operating concurrently.

10 Claims, 10 Drawing Sheets

SYSTEM AND METHOD FOR CONTROLLING A HYBRID WELDING PROCESS

CROSS-REFERENCE TO RELATED APPLICATIONS/INCORPORATION BY REFERENCE

U.S. patent application Ser. No. 11/861,379 filed on Sep. 26, 2007 is incorporated herein by reference in its entirety as background information related to arc welding power sources and waveforms. U.S. Pat. No. 5,278,390 issued on Jan. 11, 1994 is incorporated herein by reference in its entirety as background information related to controlling a welding process. U.S. patent application Ser. No. 11/227,349 filed on Sep. 15, 2005 is incorporated herein by reference in its entirety as background information related to welding system sequence control.

TECHNICAL FIELD

Certain embodiments relate to hybrid welding. More particularly, certain embodiments relate to systems and methods for controlling a hybrid welding process.

BACKGROUND

Welding sequencing systems have been developed to sequence various welding devices at a higher system level, providing a course, low speed control and sequencing of the welding devices. For example, hybrid welding systems have been developed using an arc welder and a laser welder, where the control of the arc welder is largely separate from the control of the laser welder. Some hybrid welding systems sequence the laser welder and the arc welder with respect to each other at a higher system level, providing a course, low speed control of the laser welder in relation to the arc welder. Such hybrid welding systems tend to allow for the use of lower arc welding powers, better control of heat input to a weld, and better quality welds than obtained using arc welding alone.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY

Embodiments of the present invention comprise a system and method for controlling a hybrid welding process. A first embodiment of the present invention comprises an integrated hybrid welding power source. The integrated hybrid welding power source includes a first power supply capable of providing a first output for driving a first welding device and a second power supply capable of providing a second output for driving a second welding device. The first power supply and the second power supply are operatively connected to coordinate the first output with the second output in real time while operating concurrently.

The first power supply may include a first state based function generator and the second power supply may include a second state based function generator both operating off of a common clock signal. The first output and the second output may be coordinated in real time on a clock cycle by clock cycle basis of the common clock signal. Alternatively, the first output and the second output may be coordinated in real time on a state by state basis. As a further alternative, the first output and the second output are coordinated in real time on a welding phase by welding phase basis.

In accordance with an embodiment of the present invention the first power supply is capable of monitoring first welding feedback information and first welding status information and providing the first welding feedback information and the first welding status information to the second power supply. The first output and the second output may be modified in real time in response to, at least in part, the first welding feedback information and the first welding status information.

In accordance with an embodiment of the present invention the second power supply is capable of monitoring second welding feedback information and second welding status information and providing the second welding feedback information and the second welding status information to the first power supply. The first output and the second output may be modified in real time in response to, at least in part, the second welding feedback information and the second welding status information.

Furthermore, the first output may be modified in real time in response to, at least in part, a second welding waveform generated by the second power supply. Similarly, the second output may be modified in real time in response to, at least in part, a first welding waveform generated by the first power supply.

Another embodiment of the present invention comprises a method for controlling a hybrid welding process. The method includes generating a first welding output and generating a second welding output simultaneously with the first welding output. The method further includes coordinating the first welding output with the second welding output in real time such that a next state of the first welding output is affected by a current state of the second welding output and a next state of the second welding output is affected by a current state of the first welding output. The states may be defined by clock cycles of at least one state based function generator, state numbers and associated conditions and definitions of at least one state based function generator, or welding phases of the first welding output and the second welding output.

The method may further include monitoring first welding feedback information and first welding status information associated with the first welding output. The method may also include monitoring second feedback information and second welding status information associated with the second welding output. The method may further include modifying at least one of the first welding output and the second welding output in response to the first welding feedback information and/or the first welding status information. The method may also include modifying at least one of the first welding output and the second welding output in response to the second welding feedback information and/or the second welding status information.

A further embodiment of the present invention comprises a hybrid welding power source. The hybrid welding power source includes means for providing a first output for driving a first welding device and means for providing a second output for driving a second welding device wherein the means for providing a second output operates concurrently with the means for providing a first output. The hybrid welding power source further includes means for coordinating the first output with the second output in real time.

The hybrid welding power source may further include means for monitoring first welding feedback information and first welding status information. The hybrid welding power source may also include means for monitoring second welding feedback information and second welding status information. The hybrid welding power source may further include means for providing synergic control of at least the first output and the second output.

These and other features of the claimed invention, as well as details of illustrated embodiments thereof, will be more fully understood from the following description and drawings.

DETAILED DESCRIPTION

The term "hybrid welding", as used herein, refers to a combination of at least two welding processes. The term "welding" is used herein in a general manner and may refer to such processes including, for example, gas metal arc welding (GMAW), gas tungsten arc welding (GTAW), hot wire welding, arc brazing, resistance brazing, arc plasma welding, submerged arc welding, resistance welding, laser welding, tandem/multiple arc welding, and wire feeder control. Other types of welding processes are possible as well. For example, in hot wire laser brazing, a power source may be used as a current source to heat a wire, and a laser may be used to melt the wire into a weld joint. Certain exemplary embodiments described herein focus on hybrid laser/arc welding.

Figure 1:
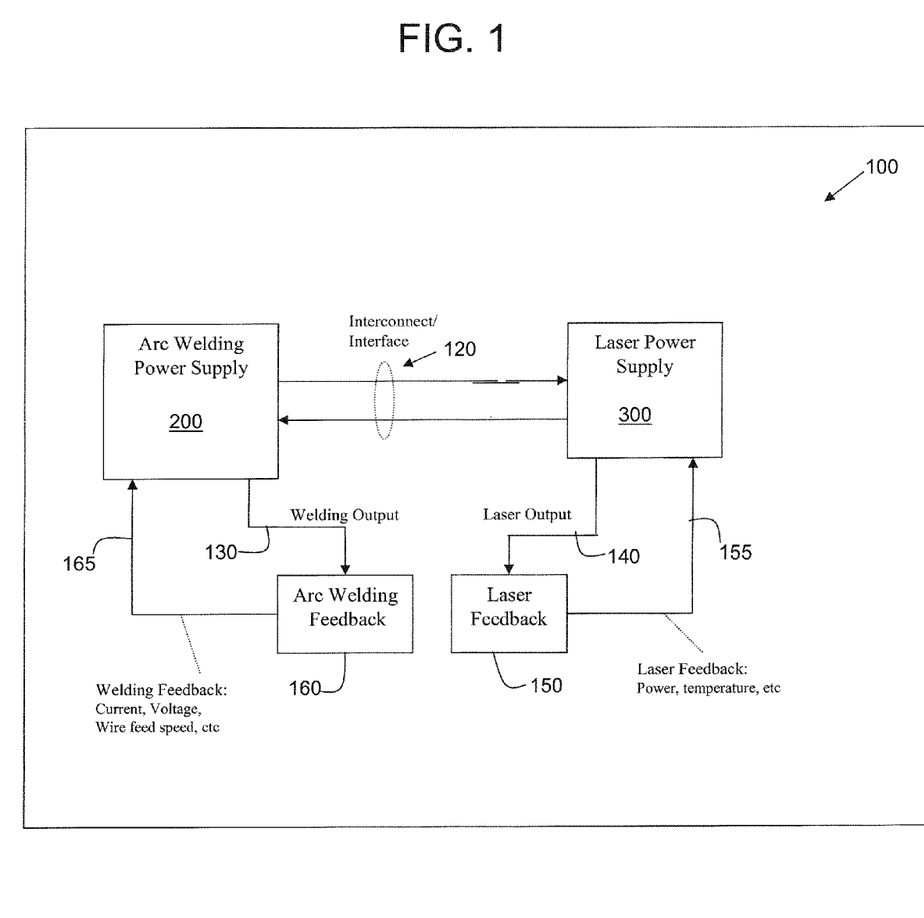
FIG. 1 illustrates a first exemplary embodiment of an integrated hybrid welding power source.

FIG. 1 illustrates a first exemplary embodiment of an integrated hybrid welding power source 100. The integrated hybrid welding power source 100 combines an arc welding power supply 200 and a laser power supply 300 into a single integrated power source 100 for welding. The arc welding power supply 200 is capable of producing an arc welding output of current and voltage waveforms that are output over an arc welding output path 130 to drive an arc welding device (e.g., a torch or gun). The laser power supply 300 is capable of producing a laser output of a driving current waveform which is coordinated with the arc welding output and is output over a laser output path 140 to drive a laser device (e.g., a diode type laser) in a pulsed or modulated manner. The term "waveforms" as used herein may refer to DC pulsed waveforms, AC waveforms, ramped waveforms, linearly increasing and/or decreasing waveforms, or non-linearly increasing and/or decreasing waveforms, for example. Other types of waveforms may be possible as well.

The arc welding power supply 200 and the laser power supply 300 are linked by a high speed communication interface 120. The high speed communication interface 120 may be a digital interface such as, for example, a low-voltage differential signaling (LVDS) interface or a fiber optic interface using a proprietary or a non-proprietary digital communication protocol. Other digital interfaces are possible as well, many of which are well known in the art.

The laser power supply 300 may send laser feedback information and laser status information to the arc welding power supply 200 over the communication interface 120. The laser feedback information may include, for example, a laser power level, a laser temperature or weld puddle temperature, a laser position, and a laser focus. The laser feedback information may be generated by laser feedback sensors or devices 150 that monitor the laser output and which may be fed back to the laser power supply 300 via a feedback path 155. Similarly, arc welding power supply 200 may send arc welding feedback information and arc welding status information to the laser power supply 300 over the communication interface 120. The arc welding feedback information may include, for example, an arc welding voltage, an arc welding current, and a wire feed speed. The arc welding feedback information may be generated by voltage, current, and speed feedback sensors or devices 160 that monitor the arc welding output and wire feed speed and which may be fed back to the arc welding power supply 200 via a feedback path 165.

The arc welding power supply 200 and the laser power supply 300 are operatively connected to each other via the communication interface 120 such that the arc welding output produced by the arc welding power supply 200 and the laser output produced by the laser power supply 300 may be coordinated with each other in real time while both the arc welding power supply 200 and the laser power supply 300 are operating concurrently with each other. The hybrid welding power source 100 is fully integrated such that the arc welding power supply 200 sends information to the laser power supply 300 over the communication interface 120 in real time, and vice versa.

The communicated information may be state based information, feedback information, and/or status information, for example. The communication interface 120 may be a high speed link between the arc welding power supply 200 and the laser power supply 300 allowing real time communications to take place on a clock cycle by clock cycle basis, a state by state basis, or on a welding phase by welding phase basis, for example. Each state is designated by a state number and has definitions that define events and conditions for that state. Once a state is entered, the state may be exited by certain changes taking place (e.g., conditional changes, logical changes, current or voltage threshold limits being reached, and/or timing limits being reached). A current state number of the arc welding power supply 200 may be reported to the laser power supply 300 over the communication interface 120, and vice versa. For example, if an arc welding state number has changed, a next state number for the laser power supply may change in response to the changed arc welding state number.

Figure 2:
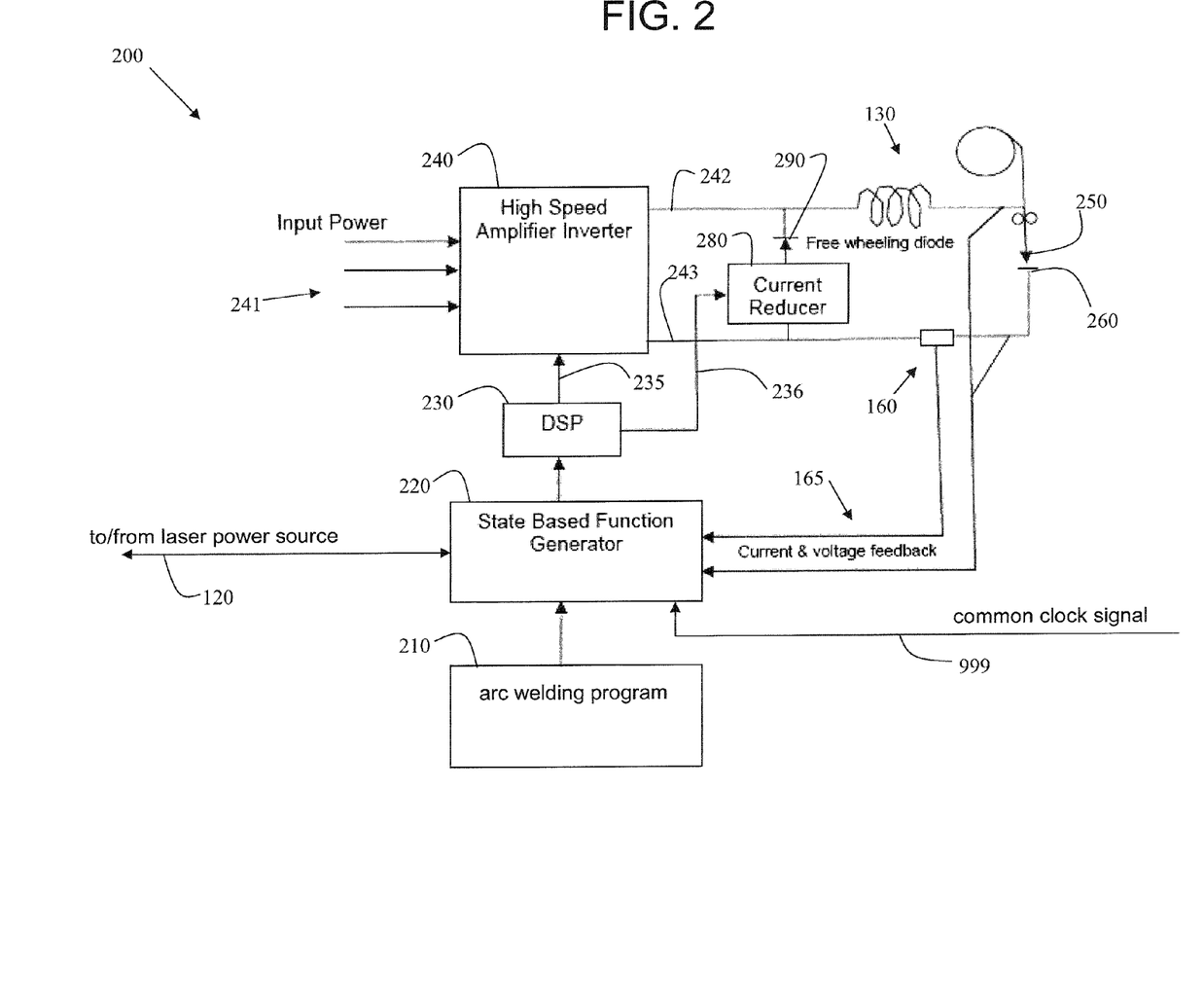
FIG. 2 illustrates an exemplary embodiment of an arc welding power supply used in the hybrid welding power source of FIG. 1.

FIG. 2 illustrates an exemplary embodiment of an arc welding power supply 200 and associated arc welding feedback capability 160 used in the hybrid welding power source 100 of FIG. 1 (shown operatively connected to a welding electrode 250 and a welding workpiece 260 which are not a part of the arc welding power supply 200). The arc welding power supply 200 is a state machine type of system as is described herein.

The arc welding power supply 200 includes an arc welding program 210 loaded onto a state based function generator 220. In accordance with an embodiment of the present invention, the state based function generator 220 includes a programmable microprocessor device. The arc welding program 210 includes the software instructions for generating an arc welding waveform and for generating real time information to be provided to the laser power supply 300 via the communication interface 120 in order to coordinate a laser output with an arc welding output. The system further includes a digital signal processor (DSP) 230 operationally interfacing to the state based function generator 220. The system also includes a high speed amplifier inverter 240 operationally interfacing to the DSP 230. Other processor types such as a reduced instruction set computer (RISC), a central processing unit (CPU), an application specific integrated circuit (ASIC), and a microcontroller may be used, as are well known in the art. Also, instead of an amplifier inverter, other power types (e.g., a chopper) may be used which are well known in the art.

The DSP 230 takes its instructions from the state based function generator 220 and controls the high speed amplifier inverter 240. The high speed amplifier inverter 240 transforms a high voltage input power 241 into a low voltage welding output power in accordance with control signals 235 from the DSP 230. For example, in accordance with an embodiment of the present invention, the DSP 230 provides control signals 235 which determine a firing angle (timing of switch activation) for the high speed amplifier inverter 240 to produce various phases of an electric welding waveform.

The outputs 242 and 243 of the high speed amplifier inverter 240 may be operationally connected to a welding electrode 250 and a workpiece 260 respectively to provide a welding current which forms an electric arc between the electrode 250 and the workpiece 260.

The arc welding power supply 200 also includes voltage and current feedback capability 160 which senses a voltage between the electrode 250 and the workpiece 260 and which senses current flowing through the welding circuit formed by the electrode 250, the workpiece 260, and high speed amplifier inverter 240. The sensed current and voltage may be fed back over the feedback path 165 and used by the state based function generator 220 to, for example, detect shorting of the electrode 250 to the workpiece 260 (i.e., a short condition) and to detect when a molten metal ball is about to pinch off from the electrode 250 (i.e., a de-short condition) during a welding process. Instantaneous voltage and current may be continuously monitored and fed back. Also, laser feedback and status information may be fed back to the state based function generator 220 of the arc welding power supply 200 from the laser power supply 300 over the communication interface 120 and used to determine, at least in part, a next state or phase of the state based function generator 220.

The arc welding power source 200 further includes a current reducer 280 and a diode 290. The current reducer 280 and the diode 290 are operationally connected between the outputs 242 and 243 of the high speed amplifier inverter 240. The current reducer 280 also operationally interfaces to the DSP 230. When a short condition occurs between the electrode 250 and the workpiece 260, the DSP 230 may command the current reducer 280, via a control signal 236, to pull the current level through the welding circuit below a predefined background current level. Similarly, when a de-short condition occurs (i.e., a molten metal ball pinches off from the distal end of the electrode 250) the DSP 230 may command the current reducer 280 to pull the current level through the welding circuit below a predefined background current level. In accordance with an embodiment of the present invention, the current reducer 280 includes a Darlington switch, a resistor, and a snubber.

Figure 3:
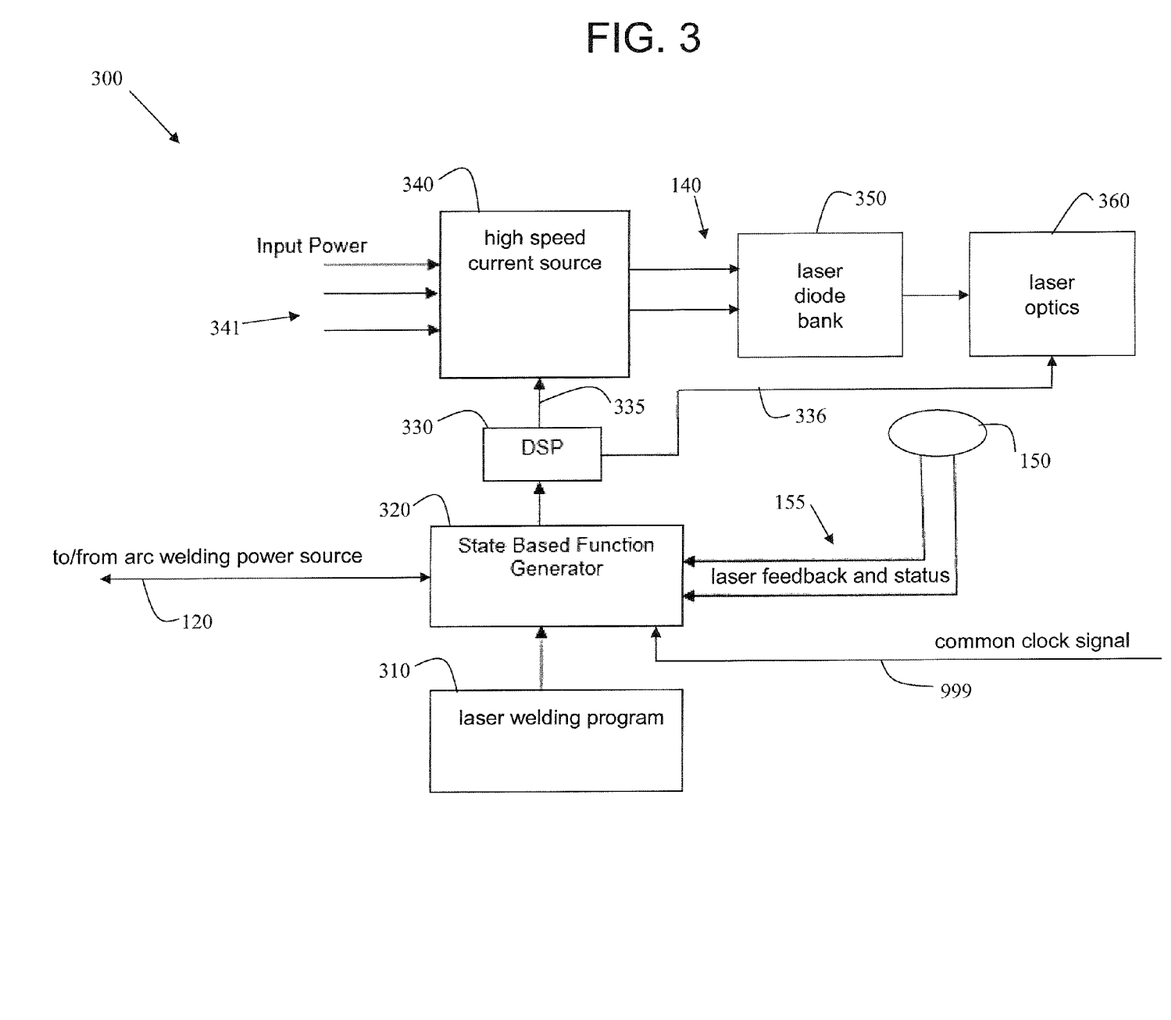
FIG. 3 illustrates an exemplary embodiment of a laser power supply used in the hybrid welding power source of FIG. 1.

The laser power supply 300 may include a well regulated current source with various safety capabilities and features and is used to drive a laser device. The laser device may include a bank of laser diodes and various optics (e.g., lenses, beam splitters, reflectors, a servo mirror, a fiber head), all of which may be controlled by the laser power supply 300.

For example, FIG. 3 illustrates an exemplary embodiment of a laser power supply 300 and associated laser feedback capability 150 used in the hybrid welding power source 100 of FIG. 1 (shown operatively connected to a laser diode bank 350 and laser optics 360 which are not a part of the laser power supply 300). The laser power supply 300 is a state machine type of system as is described herein.

The laser power supply 300 includes a laser welding program 310 loaded onto a state based function generator 320. In accordance with an embodiment of the present invention, the state based function generator 320 includes a programmable microprocessor device. The laser welding program 310 includes the software instructions for generating a pulsed or modulated laser waveform and for generating real time information to be provided to the arc welding power supply 200 via the communication interface 120 in order to coordinate a laser output with an arc welding output. The system further includes a digital signal processor (DSP) 330 operationally interfacing to the state based function generator 320. The system also includes a high speed current source 340 operationally interfacing to the DSP 330. Other processor types such as a reduced instruction set computer (RISC), a central processing unit (CPU), an application specific integrated circuit (ASIC), and a microcontroller may be used, as are well known in the art.

The DSP 330 takes its instructions from the state based function generator 320 and controls the high speed current source 340. The high speed current source 340 transforms an input power 341 into a laser driving output power in accordance with control signals 335 from the DSP 330. For example, in accordance with an embodiment of the present invention, the DSP 330 provides control signals 335 which determine a driving current to be produced by the high speed current source 340 to produce various states or phases of a laser welding waveform.

The output 140 of the high speed current source 340 may be operationally connected to a laser diode bank 350 to provide a laser driving current which forms a laser beam that is fed to the laser optics 360 where the laser beam is shaped, focused, and or split. Control signals 336 from the DSP 330 may be used to control the laser optics on a state by state basis to, for example, adjust laser beam focusing, split the laser beam into multiple beams, or re-position a spatial direction of the laser beam.

The laser power supply 300 also includes laser feedback capability 150 which may sense a laser power level, a temperature, a laser position, and/or a laser focus. The sensed parameters may be fed back over the feedback path 155 and used by the state based function generator 320 to, for example, detect an overheat or an underheat condition of a welding puddle. Also, arc welding feedback and status information may be fed back to the state based function generator 320 of the laser power supply 300 from the arc welding power supply 200 over the communication interface 120 and used to determine, at least in part, a next state or phase of the state based function generator 320.

In accordance with an embodiment of the present invention, the state based function generators 220 and 320 of the arc welding power supply 200 and the laser power supply 300, respectively, may both operate off of a same common clock signal 999 allowing the laser output and the arc welding output to be coordinated in real time on a clock cycle by clock cycle basis (e.g., at a clock rate or control frequency of 120 KHz). This allows for maximum coordination of the arc welding output and the laser output. Alternatively, the state based function generators 220 and 320 of the arc welding power supply 200 and the laser power supply 300, respectively, may each operate off of a separate dedicated clock signal allowing the laser output and the arc welding output to be coordinated in real time on a state by state basis (e.g., at a state rate or state frequency of 333 Hz) or a welding phase by welding phase basis, for example. Such welding states or phases may include a start-up state or phase, a background state or phase, a peak state or phase, a tail-out state or phase, a heat-increasing state or phase, a short-clearing state or phase, a pinch state or phase, and a stopping state or phase, for example. Other states and phases are possible as well.

Figure 4:
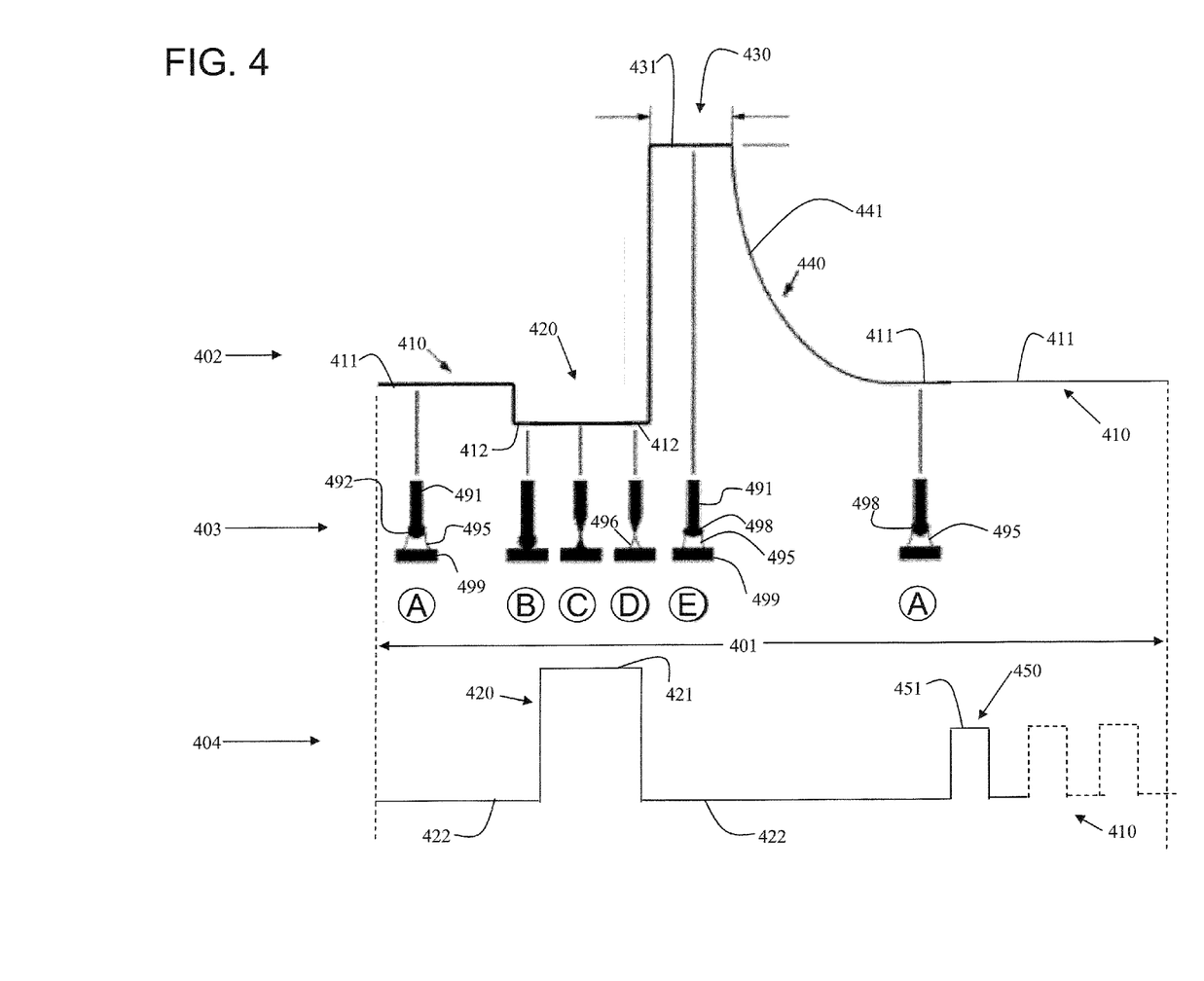
FIG. 4 illustrates an exemplary embodiment of a coordinated laser output and arc welding output achieved using the hybrid welding power source of FIG. 1.

FIG. 4 illustrates an exemplary embodiment of a coordinated laser output 404 and an arc welding output 402 achieved using the hybrid welding power source 100 of FIG. 1 over a cycle 401 of a hybrid welding process 403 to increase heat input to a weld. The various stages (A-E) of the hybrid welding process 403 over the cycle 401 use the arc welding waveform 402 and the laser waveform 404 and show the relationships between a welding electrode 491 and a metal workpiece 499. During an arc welding portion of the hybrid welding process 403, a series of electric arc pulses are generated between the advancing electrode 491 and the metal workpiece 499 using the arc welding power supply 200 of FIG. 1 and FIG. 2 which is capable of generating the arc welding waveform 402 to produce the electric arc pulses.

In general, the cycle 401 periodically repeats during the hybrid welding process to produce the resultant weld. However, the cycle 401 may repeat without the same number of heat increasing pulses 450 and possibly without a short clearing phase 420 if a short condition does not occur. The cycle 401 of the arc welding waveform 402 includes a background current phase 410 providing a background current level 411, a peak current phase 430 providing a peak current level 431, and a tail-out current phase 440 providing a monotonically decreasing tail-out current level 441.

During the background current phase 410, an electric arc 495 is sustained between the electrode 491 and the workpiece 499 producing a molten metal ball 492 on a distal end of the electrode 491 (see stage A of the process 403). At stage B, the molten metal ball 492, still connected to the electrode 491, shorts to the workpiece 499. When the short occurs, the arc 495 is extinguished and the current level of the arc welding waveform 402 is dropped below the background current level 411 to a current level 412, allowing the molten ball 492 to wet into a puddle on the workpiece 499.

During the short clearing phase 420, a laser beam (formed by the laser diode bank 350 and laser optics 360 of FIG. 3 and driven by the high laser power supply 300 of FIG. 1 and FIG. 3) is directed to the weld and the power level of the driving laser waveform 404 is increased from a background laser power level 422 to a peak laser power level 421 which causes the shorted molten metal ball 492 to begin to pinch off from the distal end of the electrode 491 into the puddle of the workpiece 499 as shown in stage C of the process 403. As the molten metal ball 492 pinches off from the electrode 491, an arc 496 is re-established between the electrode 491 and the workpiece 499.

Once the arc 496 is re-established, the power level of the laser waveform 404 is decreased and the arc welding waveform 402 enters the peak current phase 430. During the peak current phase 430, the current level of the waveform 402 is increased to and held at the peak current level 431. In accordance with an embodiment, the peak current level 431 is the highest current level of the waveform 402 and establishes an arc 497 between the electrode 491 and the workpiece 499 of sufficient strength to begin forming a next molten metal ball 498 at the distal end of the electrode 491.

After the peak current phase 430, the arc welding waveform 402 enters the tail-out current phase 440. During the tail-out current phase 440, the current level of the waveform 402 monotonically (e.g., exponentially) decreases toward the background current level 411 providing the decreasing tail-out current level 441. The current of the waveform 402 inputs heat into the weld. The tail-out current phase 440 acts as a coarse heat control phase for the waveform 402 whereas the background current phase 410 acts as a fine heat control phase for the waveform 402. However, in certain welding applications, it may be desirable to provide additional heat input control using the laser.

After the tail-out current phase 440, the background current phase 410 is again entered, providing the background current level 411 and producing a substantially uniform next molten metal ball 498 at the distal end of the electrode 491 (stage A). During the background current phase 410, at least one heat-increasing laser pulse 450 is generated as part of the laser waveform 404, providing an intermediate laser power level 451 that is between the background laser power level 422 and the peak laser power level 421. The heat increasing laser pulse 450 may be periodically repeated within the background current phase 410 until a next short between the molten metal ball 498 and the workpiece 499 occurs, at which time the arc 495 is extinguished and the current level of the arc welding waveform 402 is dropped below the background current level 411 to a current level 412, allowing the next molten ball 498 to wet into the puddle on the workpiece 499 (stage B).

The heat-increasing laser pulses 450 serve to re-heat the puddle and surrounding area to increase penetration. Such an increase in heat provided by the heat-increasing current pulses 450 may be desired in, for example, the welding of an open root joint in order to provide better penetration without increasing the fluidity of the puddle. By using the laser waveform 404 to provide the heat increasing pulses instead of the arc welding waveform 402, the current of the arc welding waveform 402 remains low so as not to transfer droplets across the arc and not force the welding system above the short arc transition into globular transfer.

Again, in general, the cycle 401 periodically repeats during the hybrid welding process 403 to produce the resultant weld. However, the cycle 401 may repeat without the same number of heat increasing pulses 450 and possibly without the short clearing phase 420 if a short does not occur. As used herein, the term "current level" refers to a current amplitude which is substantially steady but may have some variations due to the somewhat in-exact nature of producing an arc welding waveform. Similarly, as used herein, the term "laser power level" refers to a power amplitude which is substantially steady but may have some variations due to the somewhat in-exact nature of producing a laser welding waveform.

The configuration of the integrated hybrid welding power source 100 illustrated in FIGS. 1-3 provides the control between the arc welding power supply 200 and the laser power supply 300 to allow for precise coordination of the arc welding waveform 402 and the laser waveform 404 on a state by state basis in order to clear shorts and increase the penetrating heat of the weld as described herein.

Figure 5:
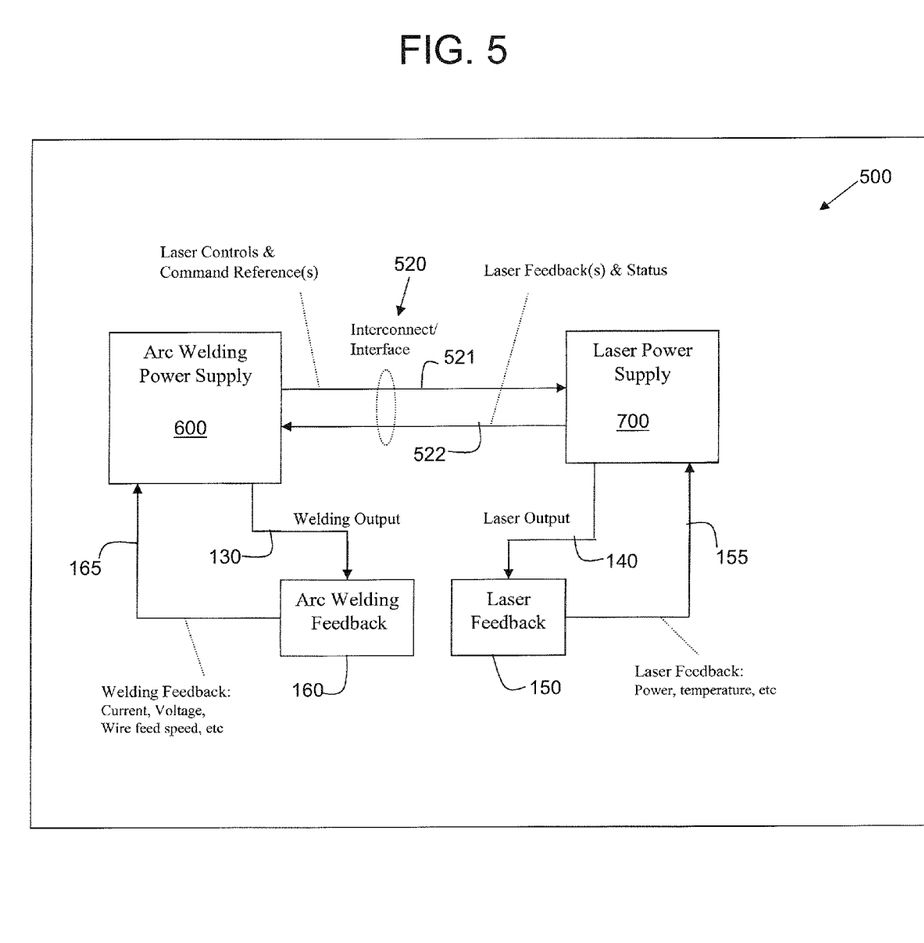
FIG. 5 illustrates a second exemplary embodiment of an integrated hybrid welding power source.

FIG. 5 illustrates a second exemplary embodiment of an integrated hybrid welding power source 500. The integrated hybrid welding power source 500 combines an arc welding power supply 600 and a laser power supply 700 into a single integrated power source 500 for welding. The arc welding power supply 600 is capable of producing an arc welding output of current and voltage waveforms that are output over an arc welding output path 130 to drive an arc welding device (e.g., a torch or gun). The laser power supply 700 is capable of producing a laser output of current or voltage levels which are coordinated with the arc welding output and are output over a laser output path 140 to drive a laser device (e.g., a diode type laser).

The arc welding power supply 600 and the laser power supply 700 are operatively connected to each other via a communication interface 520 such that the arc welding output produced by the arc welding power supply 600 and the laser output produced by the laser power supply 700 may be coordinated with each other. The arc welding power supply 600 sends command and control information to the laser power supply 700 over the communication interface 520. Also, the laser power supply 700 sends laser feedback information and laser status information to the arc welding power supply 600 over the communication interface 520. In such an embodiment, the arc welding power supply 600 acts as a master device and the laser power supply 700 acts as a slave device. In an alternative embodiment, the laser power supply may act as the master device and the arc welding power supply may act as the slave device.

The laser feedback information may include, for example, a laser power level, a laser temperature or weld puddle temperature, a laser position, and a laser focus. The laser feedback information may be generated by laser feedback sensors or devices 150 that monitor the laser output and which may be fed back to the laser power supply 700 via a feedback path 155. Similarly, the arc welding feedback information may include, for example, an arc welding voltage, an arc welding current, and a wire feed speed. The arc welding feedback information may be generated by voltage, current, and speed feedback sensors or devices 160 that monitor the arc welding output and wire feed speed and which may be fed back to the arc welding power supply 600 via a feedback path 165.

Figure 6:
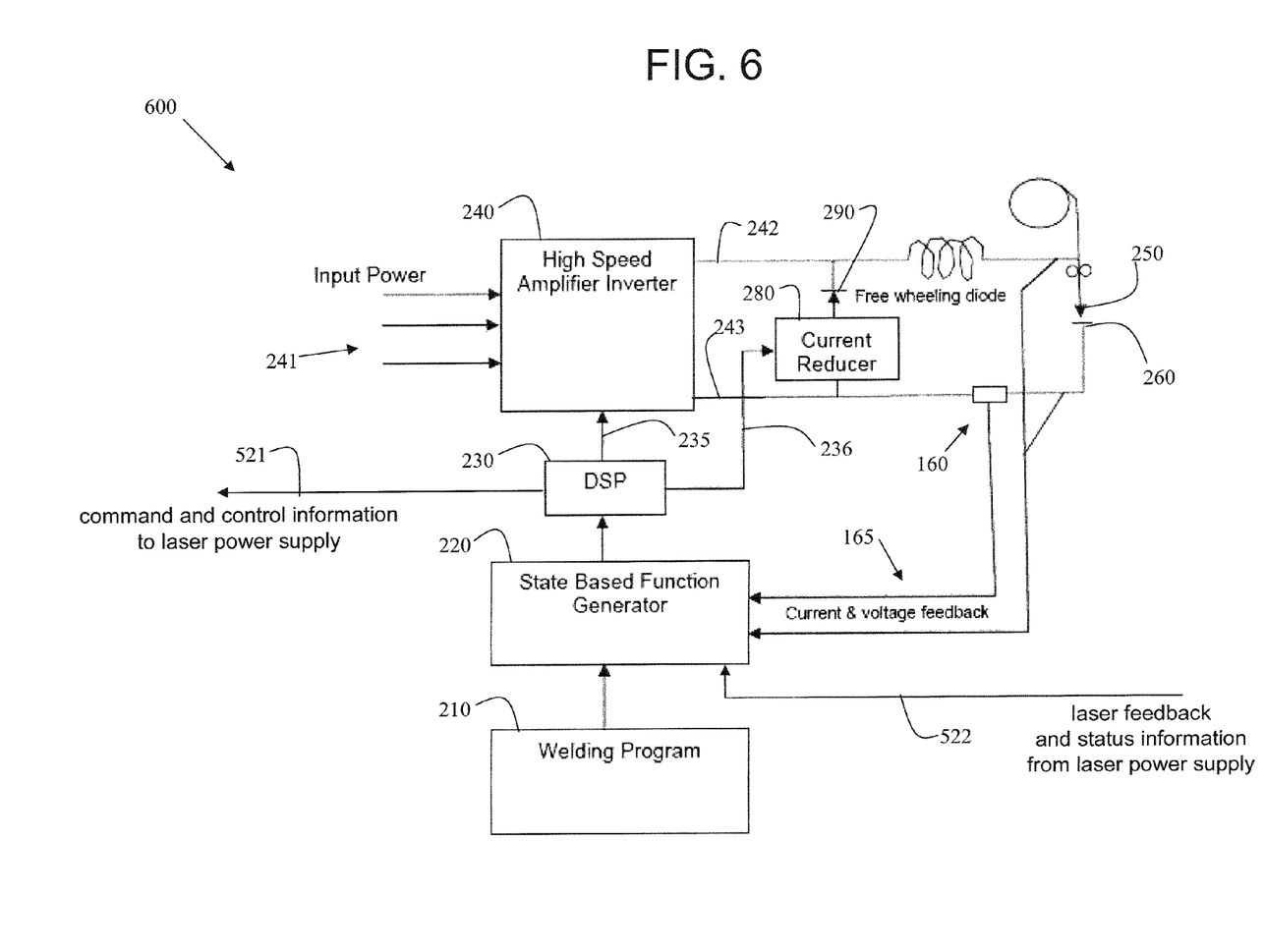
FIG. 6 illustrates an exemplary embodiment of an arc welding power supply used in the hybrid welding power source of FIG. 5.

FIG. 6 illustrates an exemplary embodiment of an arc welding power supply 600 and associated arc welding feedback capability 160 used in the hybrid welding power source 500 of FIG. 5 (shown operatively connected to a welding electrode 250 and a welding workpiece 260 which are not a part of the arc welding power supply 600). The arc welding power supply 600 is a state machine type of system as is described herein and is similar to, but not exactly the same as, the arc welding power supply 200 of FIG. 2.

The power supply 600 includes a welding program 210 loaded onto a state based function generator 220. In accordance with an embodiment of the present invention, the state based function generator 220 includes a programmable microprocessor device. The welding program 210 includes the software instructions for generating an arc welding waveform and for generating command and control information 521 to be provided to the laser power supply 700 via the communication interface 520 in order to coordinate a laser output with an arc welding output. The system further includes a digital signal processor (DSP) 230 operationally interfacing to the state based function generator 220. The system also includes a high speed amplifier inverter 240 operationally interfacing to the DSP 230. Other processor types such as a reduced instruction set computer (RISC), a central processing unit (CPU), an application specific integrated circuit (ASIC), and a microcontroller may be used, as are well known in the art. Also, instead of an amplifier inverter, other power types (e.g., a chopper) may be used which are well known in the art.

In accordance with an embodiment of the present invention, the command and control information 521 may be communicated over the communication interface 520 as high speed digital information such as, for example, by using a low-voltage differential signaling (LVDS) technique and a proprietary or a non-proprietary digital communication protocol. Other digital interfaces are possible as well, many of which are well known in the art. In accordance with an alternative embodiment of the present invention, the command and control information 521 may be communicated over the communication interface 520 as a simple analog signal(s) or analog level, communicating a control voltage to the laser power supply 700 which corresponds to a desired laser output power.

The DSP 230 takes its instructions from the state based function generator 220 and controls the high speed amplifier inverter 240. The high speed amplifier inverter 240 transforms a high voltage input power 241 into a low voltage welding output power in accordance with control signals 235 from the DSP 230. For example, in accordance with an embodiment of the present invention, the DSP 230 provides control signals 235 which determine a firing angle (timing of switch activation) for the high speed amplifier inverter 240 to produce various phases of an electric welding waveform.

The outputs 242 and 243 of the high speed amplifier inverter 240 may be operationally connected to a welding electrode 250 and a workpiece 260 respectively to provide a welding current which forms an electric arc between the electrode 250 and the workpiece 260.

The arc welding power supply 600 also includes voltage and current feedback capability 160 which senses a voltage between the electrode 250 and the workpiece 260 and which senses current flowing through the welding circuit formed by the electrode 250, the workpiece 260, and high speed amplifier inverter 240. The sensed current and voltage may be fed back over the feedback path 165 and used by the state based function generator 220 to, for example, detect shorting of the electrode 250 to the workpiece 260 (i.e., a short condition) and to detect when a molten metal ball is about to pinch off from the electrode 250 (i.e., a de-short condition). Instantaneous voltage and current may be continuously monitored and fed back. Also, laser feedback and status information 522 may be fed back to the state based function generator 220 of the arc welding power supply 600 from the laser power supply 700 over the communication interface 520 and used to modify the command and control information 521 and/or to modify the arc welding output.

The arc welding power source 600 further includes a current reducer 280 and a diode 290. The current reducer 280 and the diode 290 are operationally connected between the outputs 242 and 243 of the high speed amplifier inverter 240. The current reducer 280 also operationally interfaces to the DSP 230. When a short condition occurs between the electrode 250 and the workpiece 260, the DSP 230 may command the current reducer 280, via a control signal 236, to pull the current level through the welding circuit below a predefined background current level. Similarly, when a de-short condition occurs (i.e., a molten metal ball pinches off from the distal end of the electrode 250) the DSP 230 may command the current reducer 280 to pull the current level through the welding circuit below a predefined background current level.

In accordance with an embodiment of the present invention, the current reducer 280 includes a Darlington switch, a resistor, and a snubber.

Figure 7:
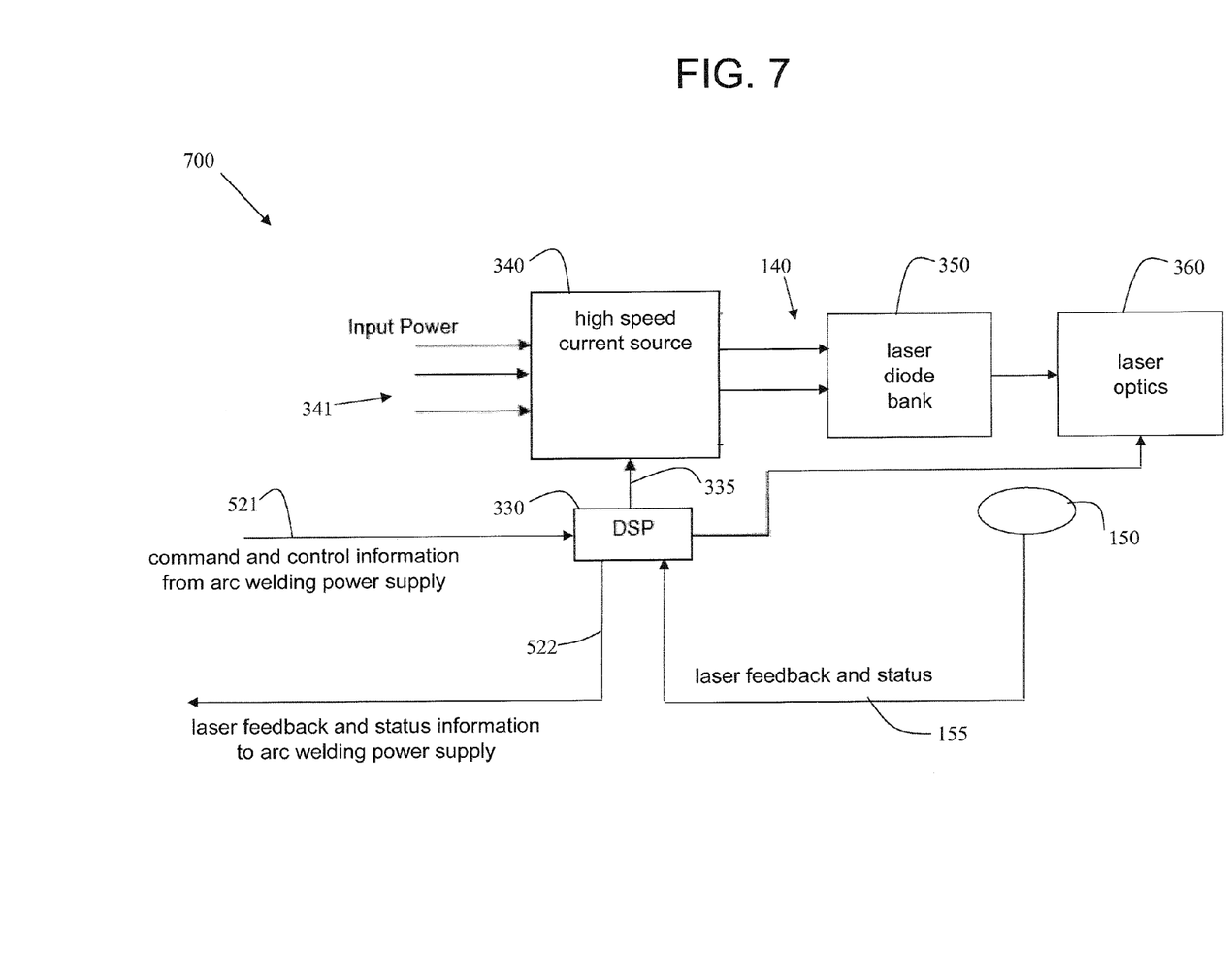
FIG. 7 illustrates an exemplary embodiment of a laser power supply used in the hybrid welding power source of FIG. 5.

The laser power supply 700 may be a well regulated current source with various safety capabilities and features and is used to drive a laser device. The laser device may include a bank of laser diodes and various optics (e.g., lenses, beam splitters, reflectors, a servo mirror, a fiber head), all of which may be controlled by the laser power supply 700.

For example, FIG. 7 illustrates an exemplary embodiment of a laser power supply 700 and associated laser feedback capability 150 used in the hybrid welding power source 500 of FIG. 5 (shown operatively connected to a laser diode bank 350 and laser optics 360 which are not a part of the laser power supply 700). The laser power supply 700 is not a state machine type of system as described previously herein, but instead acts as a slave device commanded by the arc welding power supply 600 acting as a master device.

The system includes a digital signal processor (DSP) 330 operationally interfacing to the communication interface 520 to receive command and control information 521 from the arc welding power supply 600. The system also includes a high speed current source 340 operationally interfacing to the DSP 330. Other processor types such as a reduced instruction set computer (RISC), a central processing unit (CPU), an application specific integrated circuit (ASIC), and a microcontroller may be used, as are well known in the art.

The DSP 330 takes its instructions from the command and control information 521 and controls the high speed current source 340. The high speed current source 340 transforms an input power 341 into a laser driving output power in accordance with control signals 335 from the DSP 330. For example, in accordance with an embodiment of the present invention, the DSP 330 provides control signals 335 which determine a pulsed driving current to be produced by the high speed current source 340 to produce a resultant commanded pulsed laser power output.

The output 140 of the high speed current source 340 may be operationally connected to a laser diode bank 350 to provide a laser driving current which forms a laser beam that is fed to the laser optics 360 where the laser beam is shaped, focused, and or split. Control signals 336 from the DSP 330 may be used to control the laser optics based on the command and control information 521 to, for example, adjust laser beam focusing, split the laser beam into multiple beams, or reposition a spatial direction of the laser beam.

The laser power supply 700 also includes laser feedback capability 150 which may sense a laser power level, a temperature, a laser position, and/or a laser focus. The sensed parameters may be fed back over the feedback path 155 and forwarded to the arc welding power supply 600 over the communication interface 520 and used by the arc welding power supply 600 to, for example, detect an overheat or an underheat condition of a welding puddle.

Figure 8:
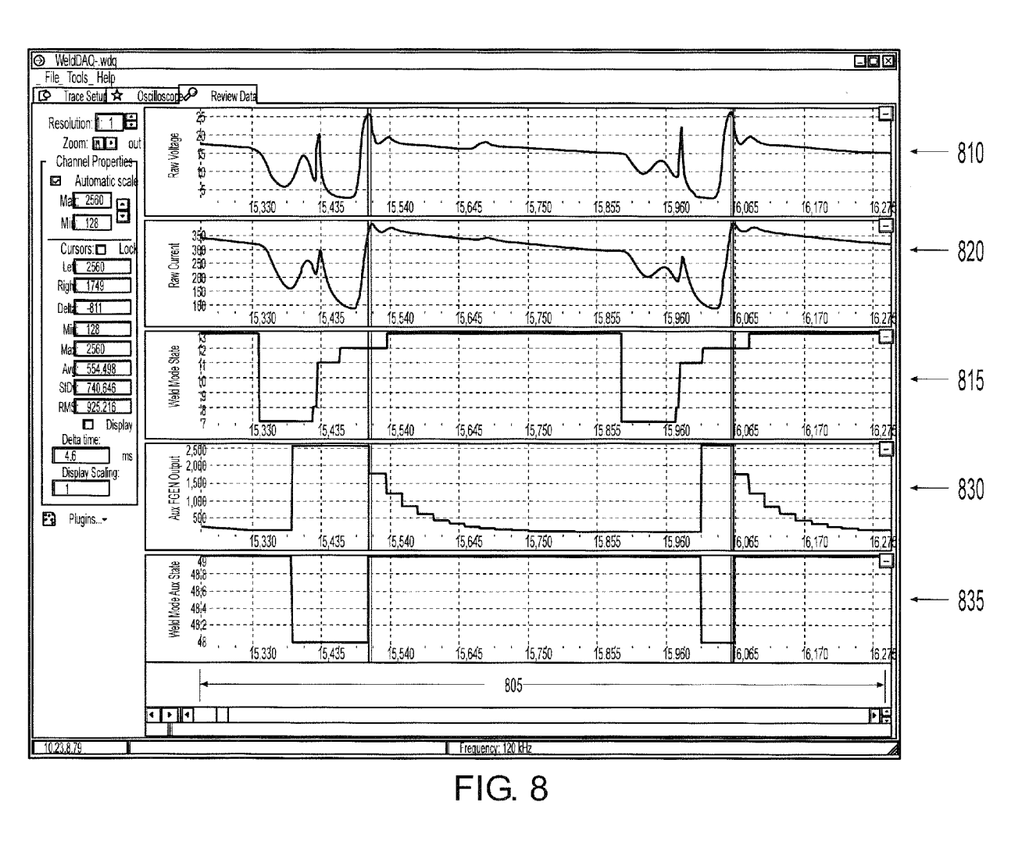
FIG. 8 illustrates an exemplary embodiment of a coordinated laser output and arc welding output achieved using the hybrid welding power source of FIG. 5.

The integrated hybrid welding power source 500 of FIG. 5 provides a somewhat lower level of integration and laser/arc welding output coordination than the welding power source 100 of FIG. 1 is capable of providing. However, significant improvements to a welding process may still be achieved. For example, FIG. 8 illustrates an exemplary embodiment of a coordinated laser output and arc welding output achieved using the hybrid welding power source 500 of FIG. 5. Waveform 810 represents the voltage of an arc welding output and waveform 820 represents the corresponding current of the arc welding output over a time segment 805. Waveform 830 represents the commanded laser power of a laser output over the time segment 805 where the laser output is coordinated with the arc welding output. Waveform 815 represents a state number for the arc welding power supply 600 and waveform 835 represents a state number for the laser welding power supply 700.

From the waveforms of FIG. 8, it may be seen that the laser power waveform 830 is synchronized to peak when the arc welding current waveform 820 drops below a first threshold level (about 150 amps). Similarly, the laser power waveform 830 remains at peak until the arc welding current waveform 820 rises above a second threshold level (about 350 amps), at which time the laser is commanded to gradually reduce its output power. Such coordination of the laser output and the arc welding output may serve to regulate the resultant average arc welding power to a lower level than may be achieved without the laser during a welding process.

Figure 9:
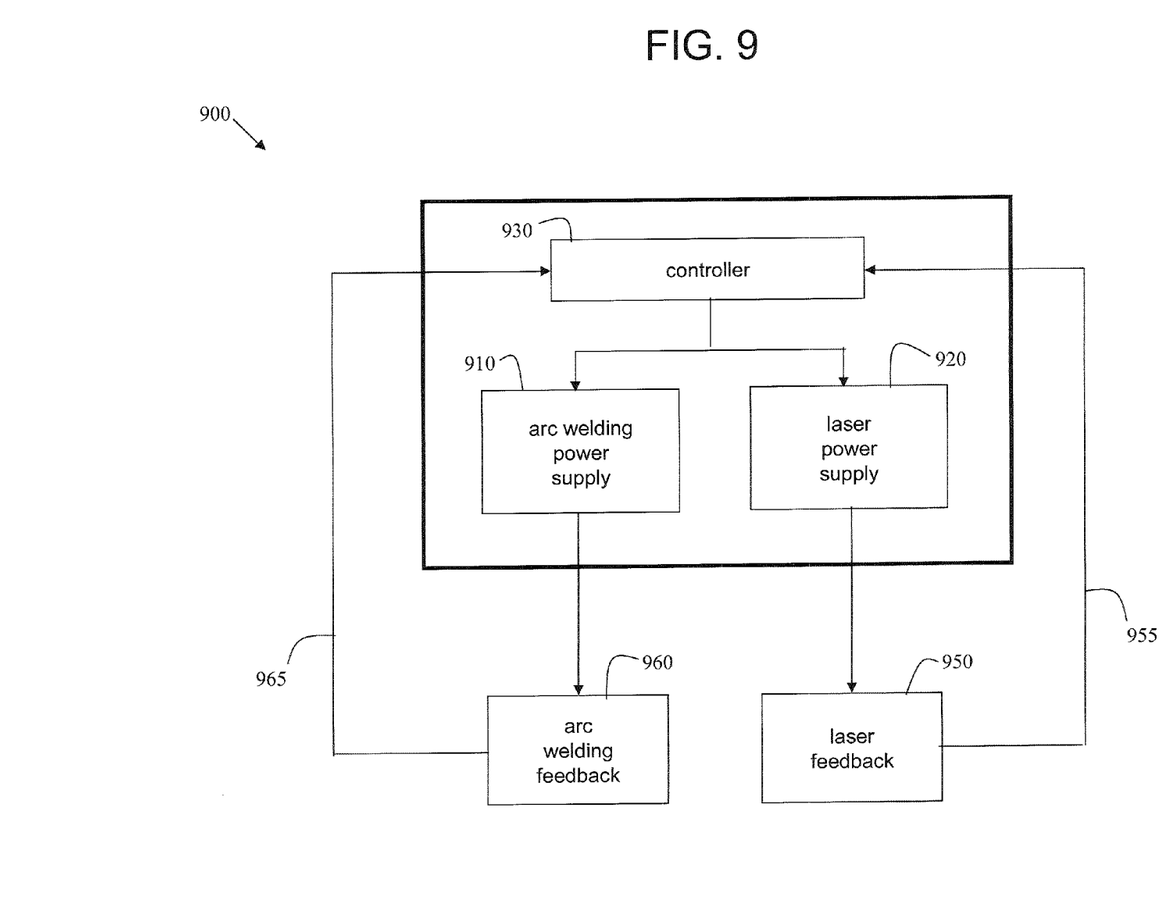
FIG. 9 illustrates a third exemplary embodiment of an integrated hybrid welding power source.

FIG. 9 illustrates a third exemplary embodiment of an integrated hybrid welding power source 900. The integrated hybrid welding power source 900 includes an arc welding power supply 910, a laser power supply 920, and a controller 930 operatively interfacing to the arc welding power supply 910 and the laser power supply 920 to coordinate the outputs of the two power supplies 910 and 920. The controller 930 may include an integrated welding program and a state based function generator. The arc welding power source may include a DSP and a high speed amplifier inverter whereas the laser power supply may include a DSP and a high speed current source.

The integrated hybrid welding power source 900 also includes laser feedback sensors or devices 950 that monitor the laser output and feed back laser parameters to the controller 930 via a feedback path 955. Similarly, the integrated hybrid welding power source 900 includes arc welding feedback sensors or device 960 that monitor the arc welding output and feed back arc welding parameters to the controller 930 via a feedback path 965.

The integrated hybrid welding power source 900 of FIG. 9 may provide the coordination precision and flexibility of the integrated hybrid welding power source 100 of FIG. 1, but using a single integrated welding program running on a single state based function generator within the controller 930.

Figure 10:
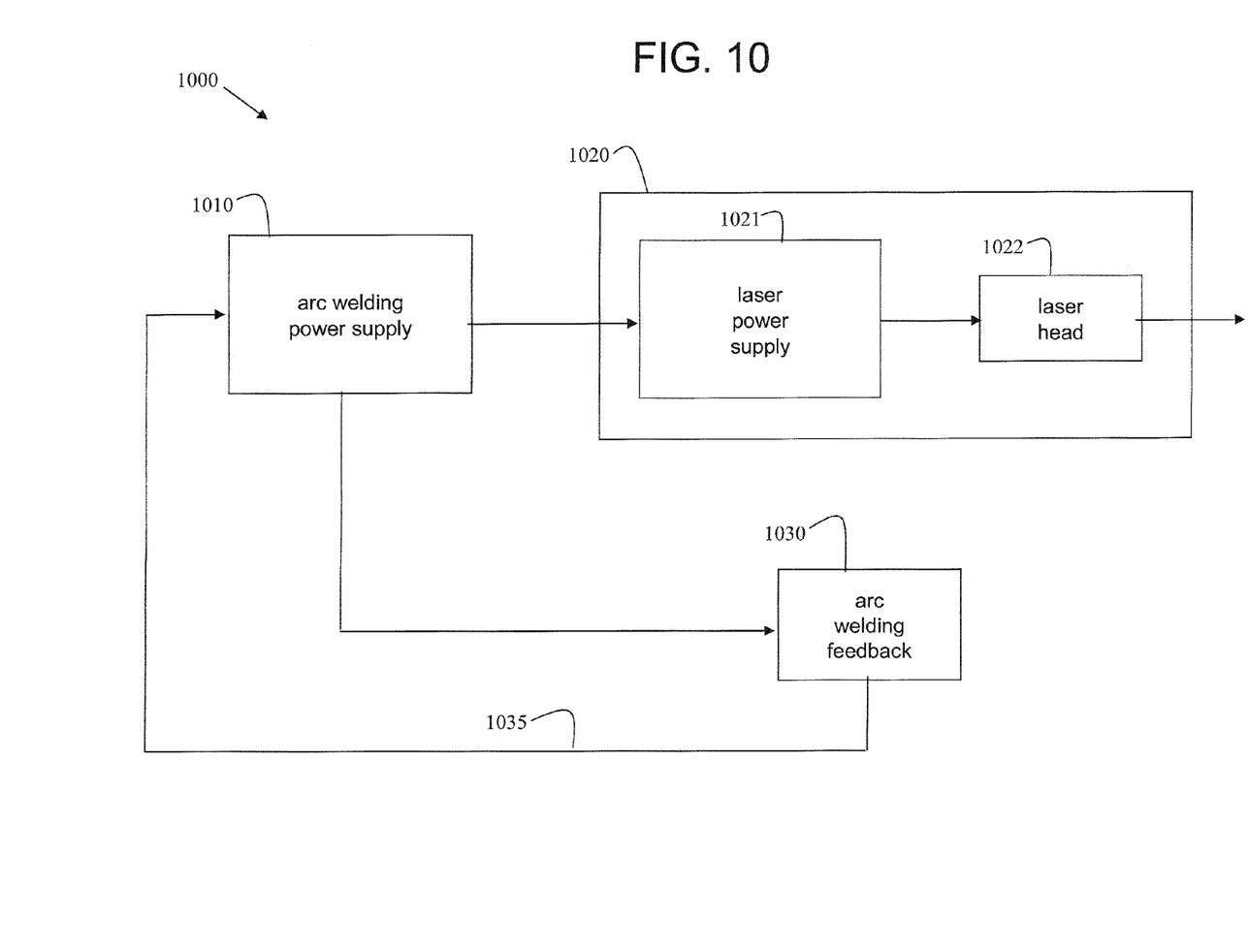
FIG. 10 illustrates an exemplary embodiment of a hybrid welding system.

FIG. 10 illustrates an exemplary embodiment of a hybrid welding system 1000. The hybrid welding system 1000 includes an arc welding power supply 1010 and a laser subsystem 1020. The laser subsystem 1020 may be an off-the-shelf laser subsystem that may be directed by a control voltage input 1015 to command a corresponding laser power level. The laser subsystem 1020 includes a laser power supply 1021 and a laser head 1022. The arc welding power supply 1010 is operatively connected to the laser power supply 1021 to command the laser power supply 1021 (e.g., via a control voltage), and the laser power supply 1021 is operatively connected to the laser head 1022 to drive the laser head 1022 (e.g., via a driving current level that produces the commanded laser power level). The laser power supply 1021 may include a low speed current amplifier and the laser head may include a laser diode bank and laser optics. The hybrid welding system 1000 includes arc welding feedback sensors or devices 1030 that monitor the arc welding output and feed back arc welding parameters to the arc welding power supply 1010 via a feedback path 1035. Such a configuration provides a more limited amount of coordination between the arc welding output and the laser output at least because of the lower bandwidth (response speed) of the laser power supply 1021.

Other laser and arc welding process embodiments are possible as well. For example, a laser device, a first arc welding device, and a second arc welding device may each follow is other in series in an arc welding application. The laser device may be used to preheat or pre-condition the weld and the first and second arc welding devices may follow in tandem to provide filler metal for the weld. The laser device, the first arc welding device, and the second arc welding device may all be coordinated by the power supply of the first arc welding device, for example, in accordance with the hybrid welding techniques described herein.

In accordance with an embodiment of the present invention, synergic control, which is common to arc welding power sources, is extended to include a laser. With a single point of control, functions of the arc welding power source and the laser are combined into a unified process. Adaptive behavior for regulating a consistent arc length may include the laser power level. For example, the arc length may be regulated by adapting the laser waveform. In general, it is desirable to maintain a constant arc length (and, therefore, a constant arc voltage) for a selected wire feed speed. If arc voltage deviates from the desired level, then the laser may be used to, for example, add heat to the arc welding process such that arc voltage may be brought back into control.

Furthermore, arc welding current, arc welding voltage, laser power level, and wire feed speed may all be tied together and controlled with a single control knob. For example, a single control knob for wire feed speed (the dependent variable) may also automatically adjust arc welding current levels and/or durations, arc welding voltage levels and/or durations, and laser power levels and/or durations based on predefined relationship tables of such parameters. Such tables may be tied to wire material and wire diameter also.

In accordance with other embodiments of the present invention, the integrated hybrid welding power source may provide a single set of tools for developing coordinated control. The single set of tools may include output function editors that allow for individual states and state transitions to be defined and for welding programs to be generated, along with high speed data acquisition systems.

In summary, a system and method for controlling a hybrid welding process are disclosed. An integrated hybrid welding power source includes a first power supply for providing a first welding output and a second power supply for providing a second welding output. The first power supply and the second power supply are operatively connected to coordinate the first welding output with the second welding output in real time while operating concurrently.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An integrated hybrid arc welding and laser welding power source, said integrated hybrid arc welding and laser welding power source comprising:
    an arc welding power supply capable of providing an arc welding output for driving an arc welding device;
    a laser welding power supply capable of providing a laser welding output for driving a laser welding device; and
    a high-speed communication interface,
    wherein said arc welding power supply and said laser welding power supply are operatively connected via the high-speed communication interface to provide two-way communication to coordinate said arc welding output with said laser welding output in real time, while operating concurrently, such that a next output of said arc welding output is affected by a current output of said laser welding output and a next output of said laser welding output is affected by a current output of said arc welding output,
    wherein said arc welding power supply is configured to monitor arc welding feedback information and arc welding status information and provide said arc welding feedback information and said arc welding status information to said laser welding power supply via said two-way communication, and
    wherein said laser welding power supply is configured to monitor laser welding feedback information and laser welding status information and provide said laser welding feedback information and, said laser welding status information to said arc welding power supply via said two-way communication.

2. The integrated hybrid welding power source of claim 1 wherein said arc welding power supply includes a first state based function generator and said laser welding power supply includes a second state based function generator both operating off of a common clock signal, and wherein said arc welding output and said laser welding output are coordinated in real time on a clock cycle by clock cycle basis of said common clock signal.

3. The integrated hybrid welding power source of claim 1 wherein said arc welding power supply includes a first state based function generator and said laser welding power supply includes a second state based function generator, and wherein said arc welding output and said laser welding output are coordinated in real time on a state by state basis.

4. The integrated hybrid welding power source of claim 1 wherein said arc welding power supply includes a first state based function generator and said laser welding power supply includes a second state based function generator, and wherein said arc welding output and said laser welding output are coordinated in real time on a welding phase by welding phase basis.

5. The integrated hybrid welding power source of claim 1 wherein at least one of said arc welding output and said laser welding output is modified in real time in response to, at least in part, said arc welding feedback information and said arc welding status information.

6. The integrated hybrid welding power source of claim 1 wherein at least one of said arc welding output and said laser welding output is modified in real time in response to, at least in part, said laser welding feedback information and said laser welding status information.

7. The integrated hybrid welding power source of claim 1 wherein said arc welding output is modified in real time in response to, at least in part, a laser welding waveform generated by said laser welding power supply.

8. The integrated hybrid welding power source of claim 1 wherein said laser welding output is modified in real time in response to, at least in part, an arc welding waveform generated by said arc welding power supply.

9. An integrated hybrid arc welding and laser welding power source, said integrated hybrid arc welding and laser welding power source comprising:
    means for providing an arc welding output for driving an arc welding device;
    means for providing a laser welding output for driving a laser welding device, wherein said means for providing a laser welding output operates concurrently with said means for providing an arc welding output;

means for providing two-way communication coordinating said arc welding output with said laser welding output in real time, such that a next output of said arc welding output is affected by a current output of said laser welding output and a next output of said laser welding output is affected by a current output of said arc welding output;

means for monitoring arc welding feedback information and arc welding status information and providing said arc welding feedback information and said arc welding status information to said means for providing a laser welding output via said means for providing two-way communication and;

means for monitoring laser welding feedback information and laser welding status information and providing said laser welding feedback information and said laser welding status information to said means for providing an arc welding output via said means for providing two-way communication.

10. The hybrid welding power source of claim 9 further comprising means for providing synergic control of at least said arc welding output and said laser welding output.

\* \* \* \* \*